United States Patent
Nakashio et al.

(10) Patent No.: US 12,079,525 B2
(45) Date of Patent: Sep. 3, 2024

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventors: Hidekazu Nakashio, Saitama (JP); Yukihiro Shindo, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/866,938

(22) Filed: Jul. 18, 2022

(65) Prior Publication Data
US 2023/0044272 A1 Feb. 9, 2023

(30) Foreign Application Priority Data
Jul. 21, 2021 (JP) .................. 2021-120847

(51) Int. Cl.
*G06F 3/12* (2006.01)

(52) U.S. Cl.
CPC .......... *G06F 3/1208* (2013.01); *G06F 3/1253* (2013.01); *G06F 3/1204* (2013.01)

(58) Field of Classification Search
USPC .......................................... 358/1.9
See application file for complete search history.

(56) References Cited

U.S. PATENT DOCUMENTS

| | | | |
|---|---|---|---|
| 8,861,024 B2 | 10/2014 | Teraue | |
| 2008/0240829 A1* | 10/2008 | Miyazaki | H04N 1/00204 400/76 |
| 2012/0075645 A1* | 3/2012 | Katayama | H04N 1/6055 358/1.9 |
| 2012/0206743 A1* | 8/2012 | Murakami | H04N 1/6055 358/1.9 |
| 2015/0015900 A1* | 1/2015 | Togashi | G06K 15/027 358/1.9 |
| 2019/0174024 A1* | 6/2019 | Fukasawa | H04N 1/603 |
| 2019/0189081 A1* | 6/2019 | Fukasawa | G09G 5/06 |
| 2019/0301941 A1* | 10/2019 | Kawabata | H04N 1/46 |

FOREIGN PATENT DOCUMENTS

| | | |
|---|---|---|
| JP | 2008182691 A | 8/2008 |
| JP | 2012217054 A | 11/2012 |
| JP | 2021019258 A | 2/2021 |

OTHER PUBLICATIONS

Extended European Search Report issued in European Appln. No. 22185639.6 mailed Nov. 17, 2022.

* cited by examiner

*Primary Examiner* — Darryl V Dottin
(74) *Attorney, Agent, or Firm* — ROSSI, KIMMS & McDOWELL LLP

(57) ABSTRACT

To make it possible for a user to easily grasp, at the time of selection of a measuring device and a chart, which are necessary for color verification of a printer, whether or not it is possible to use them. Based on a chart configuration information indicating the configuration of a chart on which a color patch is arranged and specification information indicating specifications of a measuring device that is used for colorimetry of the color patch, determination processing to check whether it is possible to perform colorimetry is performed. Then, results of the determination processing are output to be presented to a user.

14 Claims, 14 Drawing Sheets

Reason For Chart Not Being Selectable

It is not possible to perform measurement with selected measuring device because chart patch size is small

Reason For Chart Not Being Selectable

In a case of using Measuring device 1, set chart patch size to 6 × 6 mm or more.

Reason For Measuring Device Not Being Selectable

It is not possible to perform measurement without measuring ruler because chart patch size is small

INFORMATION PROCESSING APPARATUS, CONTROL METHOD THEREOF, AND STORAGE MEDIUM

BACKGROUND

Field

The present disclosure relates to a technique to verify a color accuracy of a printer.

Description of the Related Art

Generally, for a commercial color printer, in order to keep certain color reproducibility, color management is performed periodically. The color management is performed by comparing the color that is the destination (destination color), which is specified by the standard, such as ISO, and the color (printed color) printed actually by a printer and checking that the color accuracy satisfies an acceptance criterion. In a case where the color accuracy does not satisfy the acceptance criterion, in order to improve the color accuracy, re-creation of a print profile and correction processing using the color correction function of the printer are necessary, but these are the work that requires time and effort, and therefore, it is required to perform the work efficiently. In this regard, a technique has been proposed, which displays the history of the verification results as well as performing verification (color verification) of the color accuracy of the printer at a plurality of times of printing and determining the execution period of the correction work based on the verification results (Japanese Patent Laid-Open No. 2012-217054).

At the time of obtaining the printed color in color verification, a chart on which a color patch corresponding to the destination color is arranged is printed and the color value of each color patch is measured by a measuring device. At this time, in a case where the size of the color patch and the number of color patches do not match with the specifications of the measuring device, it is not possible to perform measurement. Because of this, generally, this is dealt with by using a predefined chart specified by the standard, such as ISO, which satisfies the specifications of the measuring device that is used. However, there is a case where the measuring device that is used for measurement is changed to another, or a case where a user desires to perform color verification by using a custom chart defined uniquely by the user. In this case, it is necessary for a user to check whether or not the measuring device the user desires to use corresponds to the predefined chart and whether or not the custom chart satisfies the specifications of the measuring device that is used by him/herself.

SUMMARY

The present disclosure is an information processing apparatus for verifying a color accuracy of a printer by performing colorimetry of a color patch arranged on a chart output from the printer, and including: a memory that stores a program; and a processor that executes the program to perform: determination processing to check whether it is possible to perform the colorimetry based on chart configuration information indicating the configuration of the chart and specification information indicating specifications of a measuring device that is used for the colorimetry of the color patch; and outputting results of the determination processing.

Further features of the present disclosure will become apparent from the following description of exemplary embodiments with reference to the attached drawings.

BRIEF DESCRIPTION OF THE DRAWINGS

FIG. 9A and FIG. 9B are each a diagram showing an example of a UI screen showing reason for chart not being selectable and FIG. 9C is a diagram showing an example of a UI screen showing reason for measuring device not being selectable;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<System Configuration>

Figure 1:
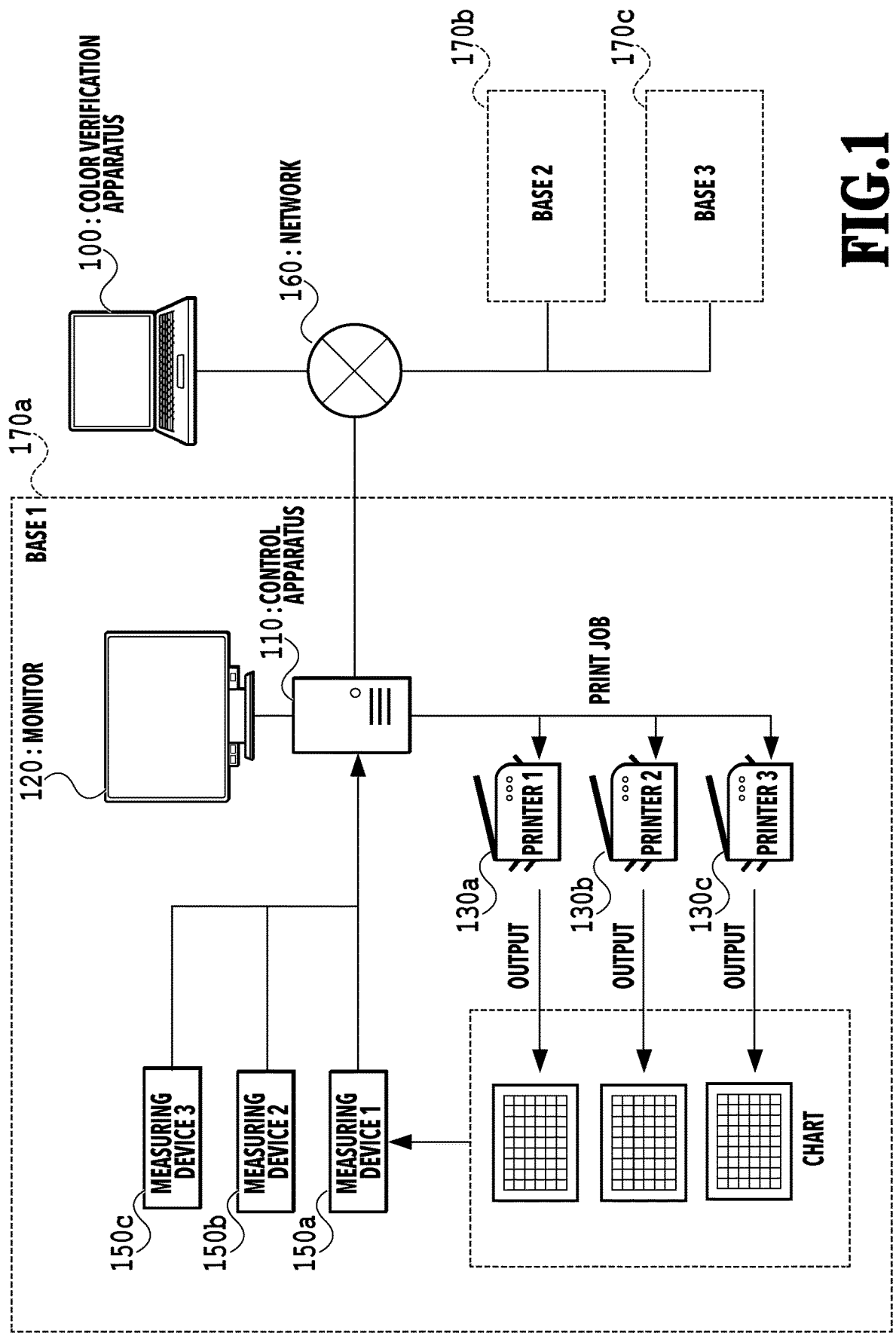
FIG. 1 is a conceptual diagram showing a general configuration of a color verification system.

FIG. 1 is a conceptual diagram showing a general configuration of a color verification system according to the present embodiment. In a case where verification of a color accuracy is performed, first, a predetermined chart is printed and output from a target printer. Next, colorimetry of the color patch on the printed and output chart is performed and the obtained the colorimetric data is transmitted to a color verification apparatus 100. Then, in the color verification apparatus 100, a shift between the printed color and the destination color (color accuracy) is checked. The color patch that is arranged on the chart is also called a color sample and in the present specification, simply described as a "patch".

In the color verification system shown in FIG. 1, the color verification apparatus 100 and bases 1 to 3 are connected by a network 160. The base 1 includes a control apparatus 110, a monitor 120, printers 1 to 3 (130a to 130c), and measuring devices 1 to 3 (150a to 150c). Further, the base 2 and the base 3 each include a control apparatus, a monitor, printers, and measuring devices. In the following, explanation is given by taking a relationship between the base 1 and the color verification apparatus 100 as an example.

The color verification apparatus 100 compares the color that is the destination (destination color) defined in advance and the color (printed color) in a case where printing is performed actually by a printer and verifies whether the color accuracy satisfies an acceptance criterion. The color verification apparatus 100 is connected with the control apparatus 110 via the network 160 so as to be capable of communicating with each other.

The control apparatus 110 is connected with the printers 130a to 130c within the base 1 via a communication network, such as an intranet, so as to be capable of communication with each other and gives printing instructions to each printer and further performs integrated management of the color accuracy of each printer, and the like. Further, in the printing instructions, for example, it is also possible to receive a print job from a client terminal (not shown schematically), divide the print job into predetermined units (for example, copy units or page units), distribute the divided print job to a plurality of printers, and give printing instructions. The print job includes a PDL data portion in which drawing instructions of the object of each attribute of text, graphics, and photo for each page and print setting information designating the size and type of a sheet and print conditions, such as both-side/one-side printing. By distributing one print job to a plurality of printers and giving printing instructions, it is possible to reduce the time required for printing and the waiting time for printing.

The monitor 120 is connected with the control apparatus 110 and displays various user interface screens (UI screens).

The printers 1 to 3 (130a to 130c) print a color image on a sheet based on the print job from the control apparatus 110 by utilizing, for example, the electrophotographic process technique. The printers 1 to 3 may be monochrome printers or printers based on another image forming technique, such as the ink jet method. Further, the printers 1 to 3 may be multi function peripherals having the copy function and the FAX function, in addition to the print function.

Figures 2A, 2B, 2C:
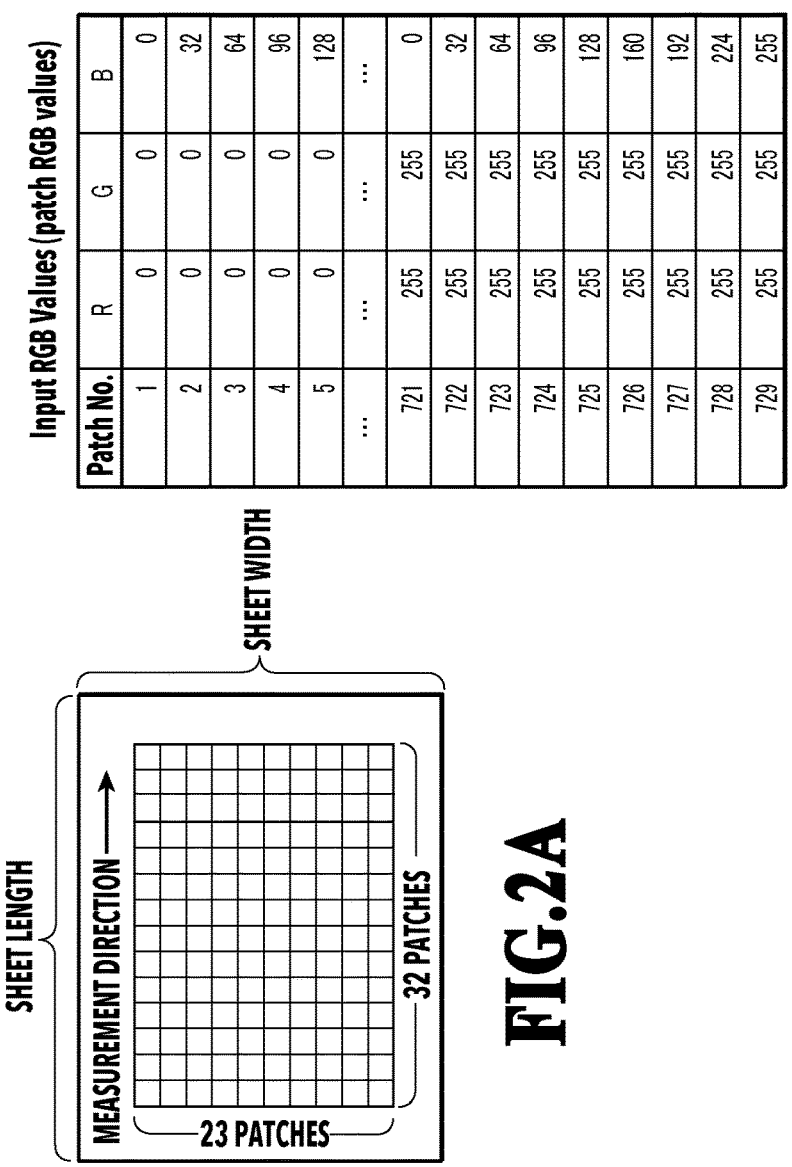
FIG. 2A is a diagram showing an example of a chart.
FIG. 2B is a diagram showing an example of destination color values of a patch.
FIG. 2C is a diagram showing an example of colorimetric data.

The measuring devices 1 to 3 (150a to 150c) are spectrometers that measure the color value of a target object based on the reflectance or transmittance of the visible light having a wavelength of about 400 nm to 700 nm. For example, the measuring devices 1 to 3 are prepared for each base and obtain colorimetric data by converting the wavelength obtained for each patch of the charts that is printed and output from the printers 1 to 3 into a value in, for example, the L*a*b* color space or XYZ color space. FIG. 2A is an example of a chart and FIG. 2B shows destination color values (RGB values) specified in the RGB color space, which correspond to each patch (patch No. 1 to 729) of the chart. The measuring devices 1 to 3 may be the handy type or the in-line type that is incorporated in the printers 1 to 3. In a case of a handy type measuring device, the measuring device is connected to the control apparatus 110 by, for example, USB or the like and obtains colorimetric data as shown in FIG. 2C by measuring the color values of each patch on the chart that is printed and output from the target printer. The obtained colorimetric data is transmitted to the color verification apparatus 100 via the control apparatus 110. Further, in a case where the color verification apparatus 100 is installed in one of the bases 1 to 3, the configuration may be one in which the color verification apparatus 100 and the measuring device are connected directly and it is possible for the color verification apparatus 100 to obtain the colorimetric data without the intervention of the control apparatus 110.

The network 160 is, for example, a local area network (LAN), the internet, an intranet or the like and may be wired or wireless.

The bases 1 to 3 (170a to 170c) correspond to locations at which there are printing companies in which printers are installed. For example, the base 1 is the printing base in Tokyo, the base 2 is the printing base in Osaka, and the base 3 is the printing base in Fukuoka, and so on.

The configuration of the color verification system shown in FIG. 1 is an example and it is possible to appropriately change the number of bases and the configuration of devices within each base. For example, the configuration may be one in which the color verification apparatus 100 is connected directly with the control apparatus 110 and the measuring devices 1 to 3 via a communication network, such as an intranet, and the color accuracy of the plurality of the printers 1 to 3 is managed. Further, for example, the configuration may be one in which an information processing apparatus having the functions of both the color verification apparatus 100 and the control apparatus 110 is provided in each base and the information processing apparatus manages the color accuracy of the plurality of printers within the base.

[Hardware Configuration of Color Verification Apparatus/Control Apparatus]

Figure 3:
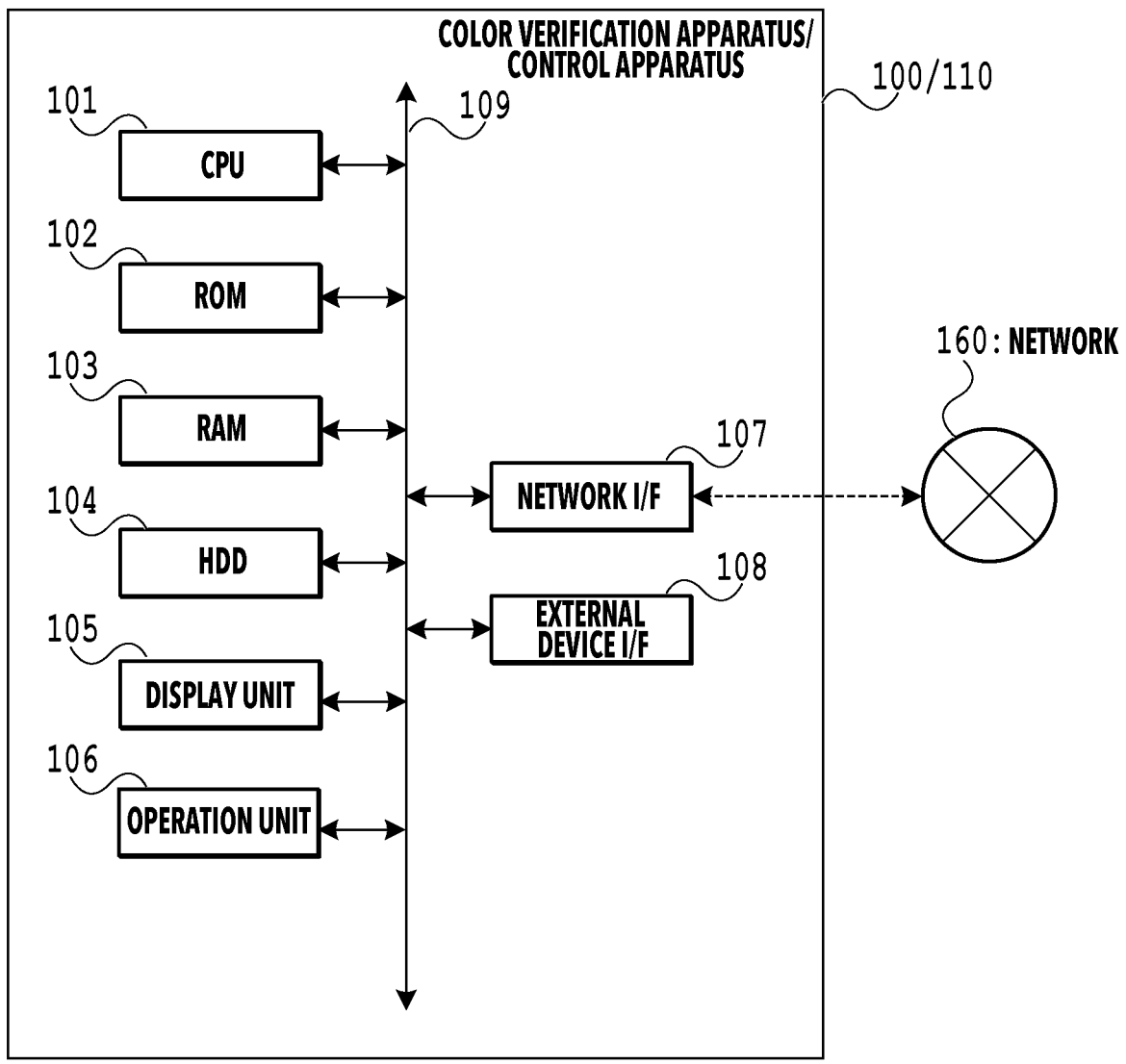
FIG. 3 is a block diagram showing a hardware configuration of a color verification apparatus and a control apparatus.

The color verification apparatus 100 and the control apparatus 110 described above are each an information processing apparatus and implemented by, for example, a general-purpose note/desktop personal computer and a tablet terminal. FIG. 3 is a block diagram showing the hardware configuration of the color verification apparatus 100/the control apparatus 110 and each apparatus has a CPU 101, a ROM 102, a RAM 103, an HDD 104, a display unit 105, an operation unit 106, a network I/F 107, and an external device I/F 108. Each of the units 101 to 108 shown in FIG. 3 is connected to one another via a system bus 109.

The CPU 101 is a computing device that performs the control of the entire apparatus and performs each piece of image processing, to be described later, based on programs stored in the ROM 102. The ROM 102 is a read only memory and stores boot programs, processing programs, character data, character code information and the like. The RAM 103 is a random access memory and utilized as a work memory at the time of the CPU 101 executing various programs. Further, the RAM 103 is utilized as a data storage area of image files received from the network I/F 109. The HDD 104 is utilized to store results of the computing performed by the CPU 101, various programs, each information file and the like. The display unit 105 includes, for example, a liquid crystal display and the like and displays a user interface screen for performing various settings and checking the device state, and so on. The operation unit 106 includes a keyboard, a button and the like and is used for a user to input and reset various setting values. The network I/F 107 is an interface for connecting a device to the network 160. Via this network I/F 107, it is possible for each of the color verification apparatus 100 and the control apparatus 110 to perform transmission and reception of various kinds of information with an external device.

The external device I/F 108 is an interface for connecting the external device, such as the measuring devices 1 to 3, via a communication bus, such as USB (Universal Serial Bus).

<Software Configuration of Color Verification Apparatus>

Figure 4:
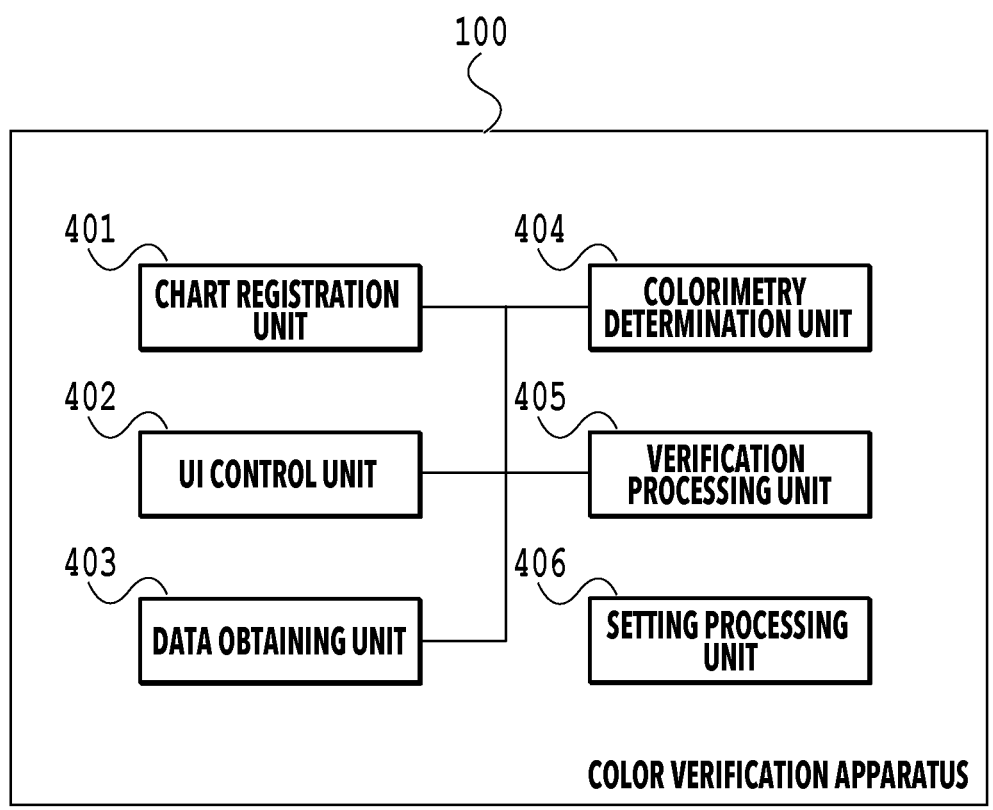
FIG. 4 is a block diagram showing a main function configuration of the color verification apparatus.

Following the above, the software configuration of the color verification apparatus 100 is explained. FIG. 4 is a block diagram showing the main function configuration of the color verification apparatus 100 according to the present embodiment. The color verification apparatus 100 comprises a chart registration unit 401, a UI control unit 402, a data obtaining unit 403, a colorimetry determination unit 404, a verification processing unit 405, and a setting processing unit 406. Each of these function units is implemented by the CPU 101 performing predetermined programs. In the following, each function unit is explained.

The chart registration unit 401 registers the chart on which patches in a variety of colors corresponding to destination color values for each type. Specifically, the image data of the registration-target chart and the information (chart configuration information) indicating the configuration of the chart, such as the number of patches in the chart and the size, are associated with each other, an ID capable of uniquely identifying the chart is attached, and stored in the HDD 104. As described previously, the chart is roughly divided into the predefined chart in accordance with the standard, such as ISO (International Standard Organization), and the custom chart defined uniquely by a user. The predefined chart is registered in advance prior to the start of utilization, for example, such as at the time of installation of a color verification program. The custom chart is registered at arbitrary timing based on a user input via the operation unit 106.

The UI control unit 402 performs display control of a user interface screen for a user to give instructions to check the situation of each device within the color verification system, to input/select various setting values, to start various kinds of processing, and so on. The user interface screen that is displayed will be described later.

The data obtaining unit 403 obtains various kinds of information/data that are used by the colorimetry determination unit 404 and the verification processing unit 405, to be described later.

The colorimetry determination unit 404 determines whether or not it is possible to measure the color value of each patch on the chart without any problem with the measuring device based on the chart configuration information indicating the chart configuration and the specification information indicating the specifications of the measuring device. In the present embodiment, whether or not each chart adapts to the specifications of the measuring device relating to the user selection.

The verification processing unit 405 performs processing to verify whether the color accuracy of the target printer reaches the acceptance criterion by using the colorimetric data received from the measuring device.

The setting processing unit 406 performs setting of various parameters relating to the verification processing based on the user selection or the like via a predetermined user interface screen.

<Flow of Processing of Entire System>

Figure 5:
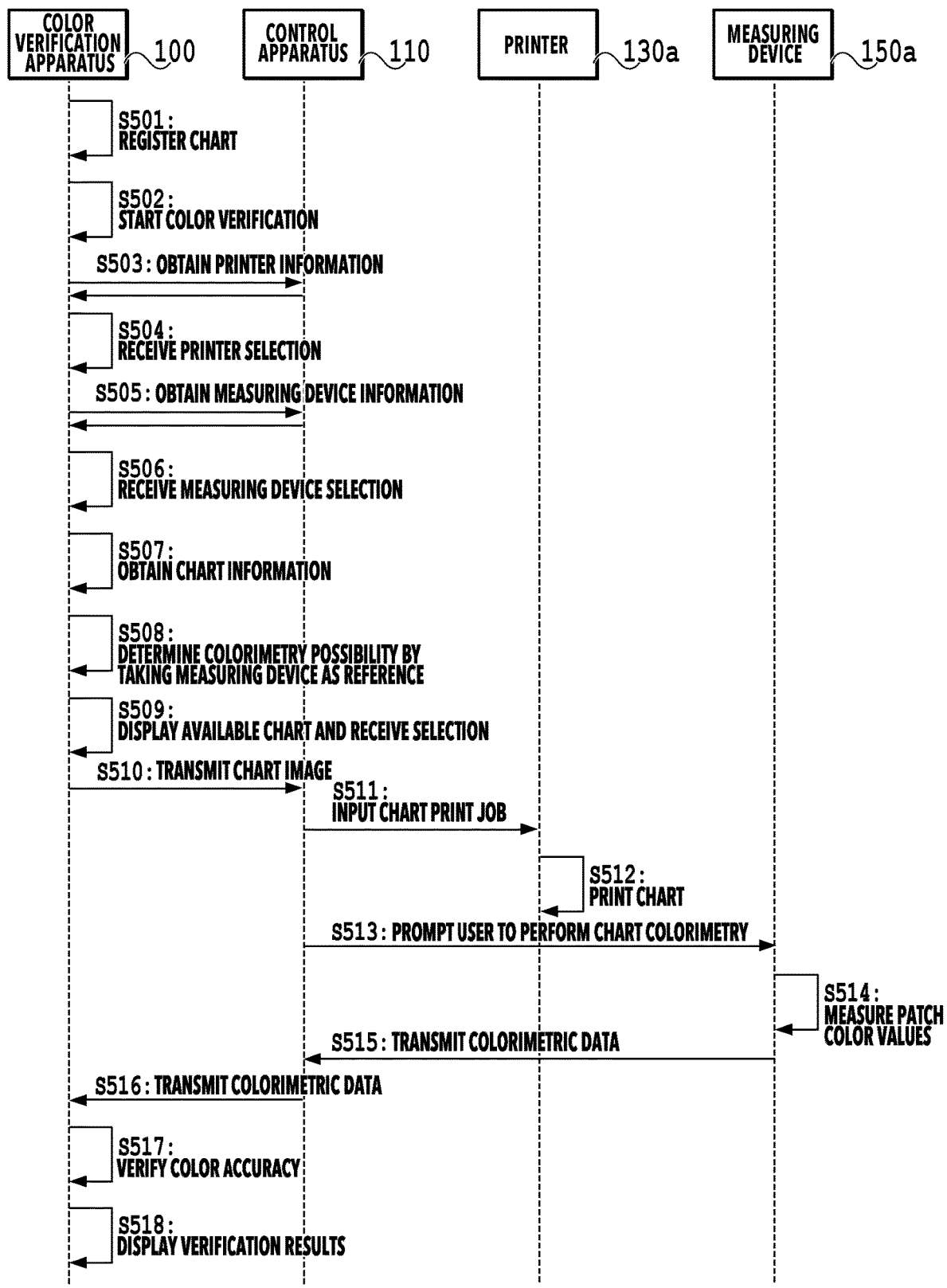
FIG. 5 is a sequence diagram showing a flow of processing in a color verification system according to a first embodiment.

FIG. 5 is a sequence diagram showing a flow of processing in the color verification system according to the present embodiment. In the following, the flow of the processing of the entire color verification system is explained along the sequence diagram in FIG. 5 by taking a case as an example where the color accuracy of the printer 1 is verified by using a custom chart defined uniquely by a user. In the following explanation, symbol "S" means a step.

S501 to S510 are all the processing in the color verification apparatus 100. First, the chart registration unit 401 registers a custom chart based on a user input (S501). In a case where a user who desires to register a custom chart presses down a Chart registration button 601 on a Main Menu screen shown in FIG. 6A, the screen makes a transition into a Chart Registration screen shown in FIG. 6B. The control of these UI screens is performed by the UI control unit 402. "Chart 1" and "Chart 2" in a display area 603 on the Chart Registration screen in FIG. 6B are the registered predefined charts determined by the standard, such as ISO. In a case where a user presses down a Chart input button 604, the screen makes a transition into a Chart Input screen shown in FIG. 6C. On the Chart Input screen in FIG. 6C, a user inputs various kinds of information necessary for the registration of the custom chart, and so on. Specifically, the name, the number of patches, the patch size, and the sheet size/type, which relate to the custom chart to be registered, are input to corresponding input fields 605 to 608, respectively. Further, a user uploads the image data of the custom chart by an Image upload button 609. The chart image is created in the file format, such as TIFF, PDF, and JPEG.

Figure 6A:
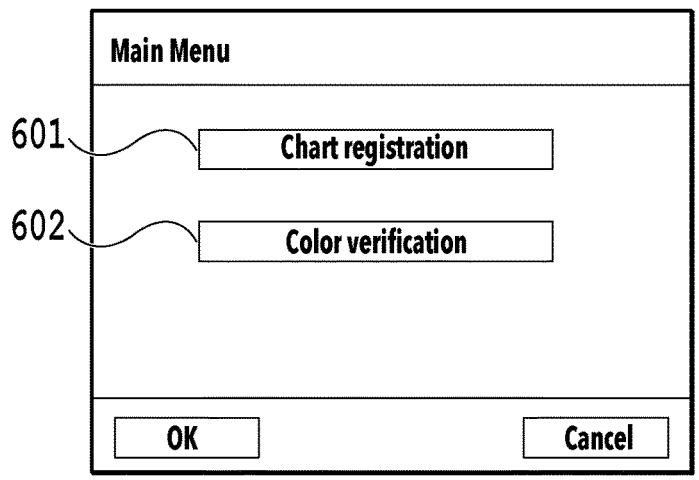
FIG. 6A is a diagram showing an example of a main menu screen.
Figure 6B:
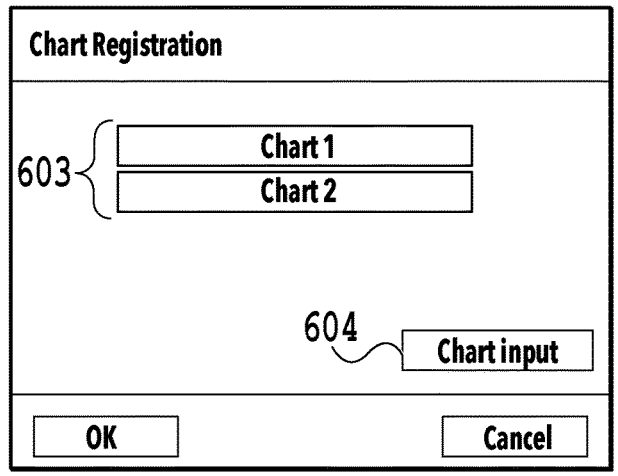
FIG. 6B is a diagram showing an example of a chart registration screen.
Figure 6C:
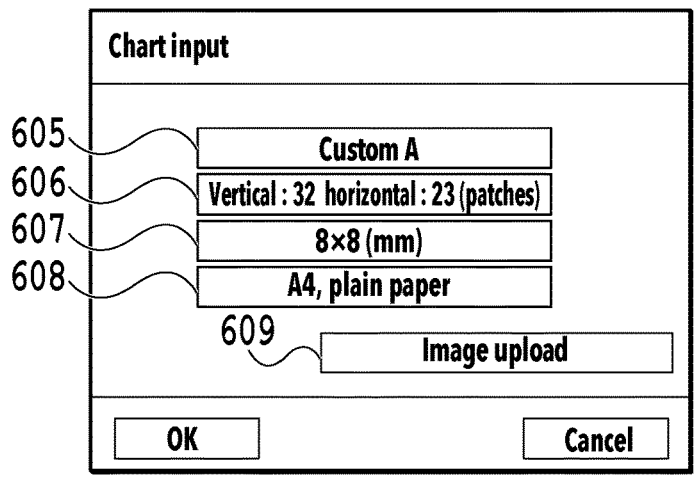
FIG. 6C is a diagram showing an example of a chart input screen.

In a case where a user having completed the input of necessary items relating to the custom chart and the uploading of the chart image returns to the Main Menu screen in FIG. 6A and presses down a Color verification button 602, color verification starts (S502).

First, the data obtaining unit 403 obtains the list of the printers 1 to 3 managed by the control apparatus 110 and the information indicating the status of each printer (in the following, called "printer status information") (S503). Here, the printer status information includes, for example, the power source state (ON/OFF), the presence/absence of failure, the print job processing situation (printing is in progress/standby) and the like. It is assumed that the printer status information is obtained and stored by the control apparatus 110 periodically accessing the printers 1 to 3. The printer list and the printer status information of each printer are called together "printer information".

Figure 7A:
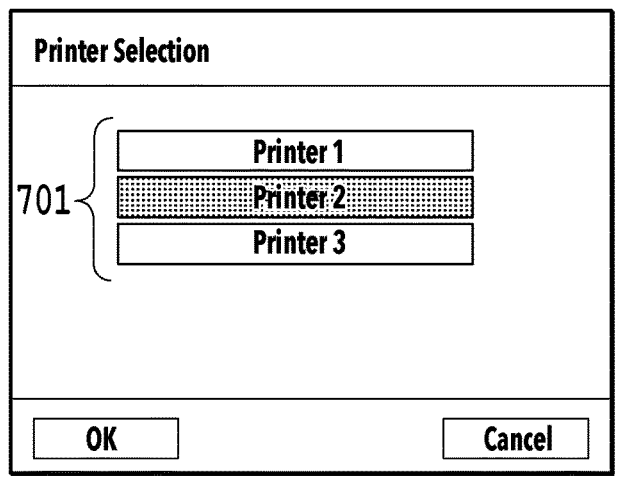
FIG. 7A is a diagram showing an example of a printer selection screen.

After the printer information is obtained, next, processing to receive a selection of a color verification-target printer (in the following, described as "target printer") is performed (S504). Specifically, the user selection is received via the UI screen displayed on the display unit 105 by the UI control unit 402 and the setting processing unit 406 sets the printer relating to the selection (here, the printer 1) as the target printer. FIG. 7A shows a Printer Selection screen at the time of a user selecting a target printer. In a display area 701 on the Printer Selection screen, the printers (here, Printer 1 to Printer 3) that can be the processing target are displayed in a list in accordance with the printer information obtained at S503. At this time, processing to gray out, for example, the printer in the printing-impossible state is performed based on the printer status information so that it is known whether the printer is in the printing-possible state or in the printing-impossible state. On the Printer Selection screen in FIG. 7A, only Printer 2 is grayed out, indicating that Printer 2 is in the printing-impossible state.

Following the reception of the target printer selection, the data obtaining unit 403 obtains the list of the measuring devices 1 to 3 managed by the control apparatus 110, the specification information on each measuring device, and the information indicating the status of each measuring device (in the following, called "measuring device status information") (S505). Here, the specification information is information indicating the specifications of each measuring device, such as the sheet size that can be dealt with, the minimum patch size, and the minimum/maximum number of patches per sheet (per page). Further, for the measuring device in which an attachment exists, the difference in the specifications due to the presence/absence of attachment is also included in the specification information. Here, the attachment means a measuring ruler, an auto feeder unit and the like. The measuring ruler is a device that assists in the slide operation at the time of measurement, which enables stable colorimetry in a handy-type measuring device. By a sensor installed at the rear side of the measuring device detecting the stripe pattern of the measuring ruler, it is made possible to detect the direction in which a user performs measurement (measurement from left to right, measurement from right to left, or the like). The auto feeder unit is a device that enables continuous colorimetry by automatically taking in charts printed and output from a printer within the measuring device. Depending on whether these attachments are used, there is a case where the utilization conditions (for example, the sheet size that can be dealt with and the minimum patch size) change. In the measuring device status information, information, for example, such as the power source state (ON/OFF) and the connection situation, is included. It is assumed that the specification information and the measuring device status information are obtained and stored by the control apparatus 110 accessing the measuring devices 1 to 3 in advance or periodically. The list of the measuring devices, the specification information on each measuring device, and the measuring device status information are called together "measuring device information".

Figure 7B:
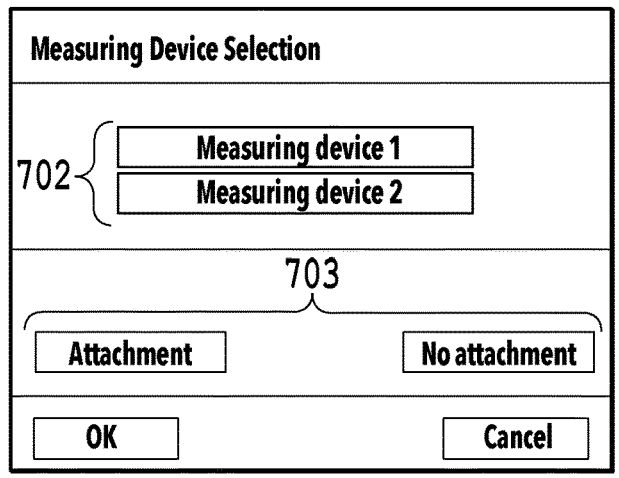
FIG. 7B is a diagram showing an example of a measuring device selection screen.

After the measuring device information is obtained, next, processing to receive the selection of a measuring device that is used for measurement of the color value of the chart is performed (S506). Specifically, the user selection is received via the UI screen displayed on the display unit 105 by the UI control unit 402 and the setting processing unit 406 sets the measuring device relating to the selection as the measuring device that is used for the chart measurement. FIG. 7B shows a Measuring Device Selection screen at the time of a user selecting a measuring device. On the Measuring Device Selection screen, two display areas exist. In a display area 702, buttons corresponding to candidate measuring devices are displayed in a list in accordance with the measuring device information obtained at S505. At this time, as in the case of the Printer Selection screen described above, it is assumed that display processing to gay out the button of the measuring device in the unusable state based on the measuring device status information is performed so that it is known whether the measuring device is in the usable state or in the unusable state. Further, in a display area 703, buttons for designating whether to use an attachment in a case where the selected measuring device is compatible with the attachment are displayed.

Following the reception of the measuring device selection, the data obtaining unit 403 obtains the list of the registered charts (the predefined chart registered in advance and the custom chart registered by a user at S501) and the above-described chart configuration information indicating the configuration of each chart (S507). The list of the registered charts and the chart configuration information on each chart are called together "chart information".

After the chart information is obtained, the colorimetry determination unit 404 performs processing to determine whether or not it is possible to perform colorimetry of the patch on the chart in a case where the measuring device selected at S506 is used for each chart included in the chart list (S508). Details of the colorimetry possibility determination processing that takes the measuring device as a reference will be described later.

Figure 7C:
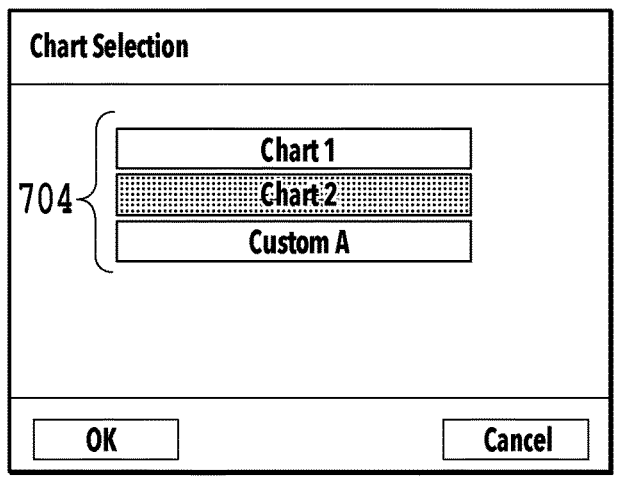
FIG. 7C is a diagram showing an example of a chart selection screen.

In a case where the colorimetry possibility determination processing is completed, processing to receive a selection of a chart that is used for color verification from the charts determined to adapt to the specifications of the selected measuring device and to be capable of being used is performed (S509). Specifically, the user selection is received via the UI screen displayed on the display unit 105 by the UI control unit 402 and the setting processing unit 406 sets the chart relating to the selection as the chart that is used for color verification. FIG. 7C shows a Chart Selection screen at the time of a user selecting a chart that is used. In a display area 704 on the Chart Selection screen, the registered charts are displayed in a list. At this time, display processing to gray out, for example, the chart that is not adaptive is performed based the results of the determination processing at S508 so that it is known whether the chart is one that adapts to the specifications of the measuring device selected by a user or one that does not adapt thereto. On the Chart Selection screen in FIG. 7C, Chart 2 is grayed out, indicating that Chart 2 is a chart that does not adapt to the specifications of the selected measuring device and cannot be used. In place of the gray-out display (or in addition to the gray-out display), it may also be possible to display in a popup manner a UI screen indicating the reason for not being selectable as shown in FIG. 9A at the time of the mouse being held above the corresponding button, and so on. At this time, it may also be possible to explicitly indicate which is not satisfied among the specifications (utilization conditions) of the selected measuring device. Further, like a UI screen in FIG. 9B, it may also be possible to display information for causing the chart to adapt to the specifications of the selected measuring device. Furthermore, it may also be possible to display a guidance of the measurement direction (scan direction) based on information on the presence/absence of attachment utilization, the dominant hand and the like. Here, explanation is continued on the assumption that the chart of "Custom A" is selected.

In a case where the target printer and the measuring device and the chart that are used for color verification of the printer are determined in this manner, the image data of the chart is provided to the target printer. In a case of the present embodiment, first, the image data of the determined chart is transmitted to the control apparatus 110 via the network I/F 107 (S510). Then, the control apparatus 110 transmits the print job of the chart to the target printer based on the received image data (S511). The target printer having received the print job performs printing processing based on the print job and outputs the chart (S512).

Figure 8A:
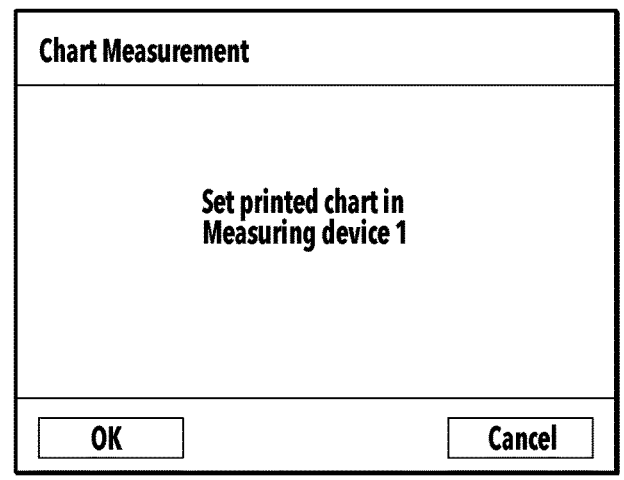
FIG. 8A is a diagram showing an example of a guidance screen.

Next, the control apparatus 110 performs processing to prompt a user to perform colorimetry of the chart printed and output from the target printer (S513). Specifically, the control apparatus 110 displays the guidance screen as shown in FIG. 8A and prompts a user to set the measuring device to the printed and output chart. In a case where the user sets the chart and gives instructions to start measurement, the color value of each patch on the chart is measured by the selected measuring device (here, Measuring device 1) (S514). After the measurement is completed, the selected measuring device transmits the obtained colorimetric data to the control apparatus 110 (S515). The control apparatus 110 having received the colorimetric data from the selected measuring device transfers the colorimetric data to the color verification apparatus 100 (S516).

In the color verification apparatus 100 having received the colorimetric data, by the verification processing unit 405, processing to verify the color accuracy of the target printer is performed by using the colorimetric data (S517). A specific procedure of verification is as follows.

Figure 8B:
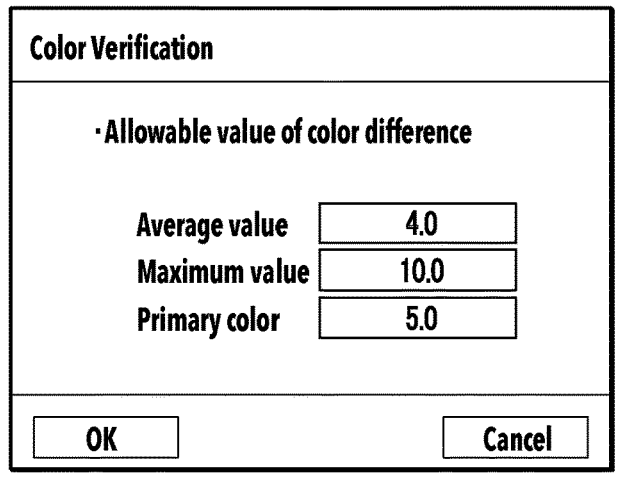
FIG. 8B is a diagram showing an example of a color verification setting screen.

First, the verification data is read from the HDD 104. Here, the verification data is data of the destination color value, the verification item and the like for each patch on the used chart. As the verification item, for example, the average value of a color difference ΔE for each patch, the maximum value of the color difference ΔE, and the color difference ΔE of the primary colors (CMYK) are used and an allowable value in accordance with the verification item is set, respectively. FIG. 8B shows a Color Verification setting screen for setting an allowable value in accordance with the verification item. A user sets in advance an allowable value in accordance with the verification item via the UI screen such as this. Here, the color difference ΔE is the direct distance between the destination color value in the L*a*b* color space and the color value (colorimetric value) indicated by the colorimetric data and for example, can be found by formula (1) below.

$$\Delta E = \sqrt{\Delta L^2 + \Delta a^2 + \Delta b^2}$$

$$\Delta L = L_1 - L_2$$

$$\Delta a = a_1 - a_2$$

$$\Delta b = b_1 - b_2 \quad \text{formula (1)}$$

Here, it is assumed that the allowable value of the color difference for each verification item as shown on the Color Verification setting screen in FIG. 8B is set in advance. In this case, on a condition that the average value of the color difference ΔE for each patch is within ±4.0, the maximum value of the color difference ΔE is within ±10.0, and the color difference ΔE of the primary colors (CMYK) (ΔE primary color) is within ±5.0, the verification results are acceptable (OK) and on a condition that one of the verification items exceeds the allowable value, the verification results are unacceptable (NG).

Figure 8C:
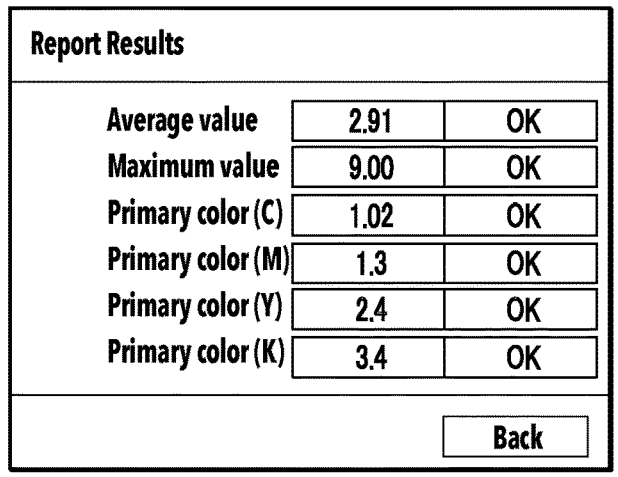
FIG. 8C is a diagram showing an example of a report results screen.

Then, by the UI control unit 402, the verification results are displayed on the display unit 105 (S518). FIG. 8C shows a Report Results screen the displays the verification results. As shown in FIG. 8C, along with the average value of the color difference for each patch, the maximum value, and the color difference of the primary colors (CMYK), the results of acceptable/unacceptable (OK/NG) for each verification item are displayed. By the Report Results screen such as this, it is made possible for a user to grasp the color variation state in the target printer. Then, in a case where the verification results are unacceptable (NG), by re-creating the print profile and performing correction work using the color correction function of the printer, it is possible to suppress the color variation of the printer within the specified range.

The above is the flow of the entire processing in the color verification system. At the same timing of the display prompting a user to perform colorimetry of the chart, it may also be possible for the control apparatus 110 to instruct the selected measuring device to make preparations and cause the measuring device to perform calibration before the measurement starts.

<Colorimetry Possibility Determination Processing>

Figure 10:
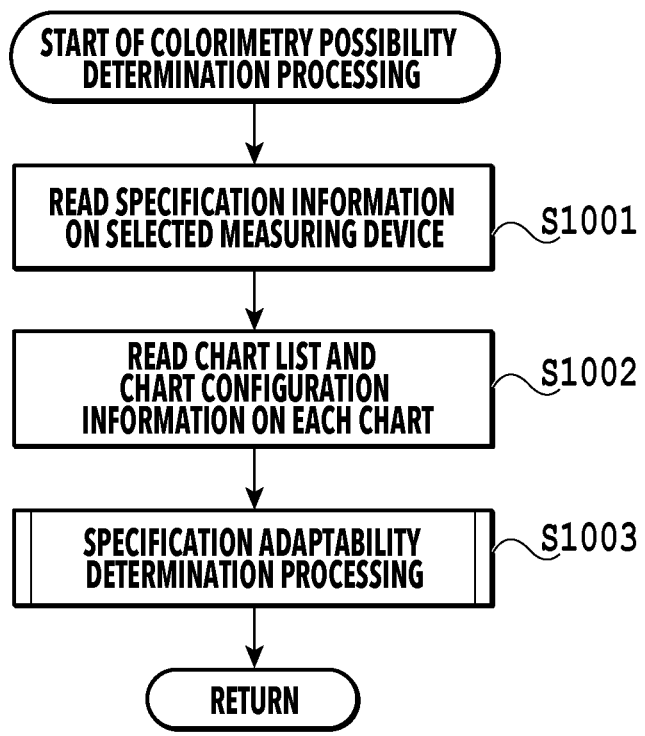
FIG. 10 is a flowchart showing a flow of colorimetry possibility determination processing according to the first embodiment.

Following the above, the colorimetry possibility determination processing that takes the measuring device as a reference (S508) is explained in detail by referring to the flowchart in FIG. 10. The series of processing shown in the flowchart in FIG. 10 is implemented by the CPU 101 of the color verification apparatus 100 loading the program corresponding to the colorimetry determination unit 404 from the ROM 102 onto the RAM 103 and executing the program. In the following explanation, symbol "S" means a step.

At S1001, specification information on the measuring device (here, Measuring device 1) selected by a user is read from the HDD 104 or the like. Here, it is assumed that the contents shown in Table 1 below are read as the specification information on Measuring device 1.

TABLE 1

| | Specification Information | |
|---|---|---|
| 1 | Sheet width (y) | 45-330 mm |
| 2 | Sheet length (x) | 170-1500 mm |
| 3 | Sheet thickness | 0.05-0.45 mm |
| 4 | Minimum patch size | 6 × 6 mm |
| 5 | Maximum number of patches per page | A4: 1394 A3: 2928 |
| 6 | Attachment | None |

At next S1002, the contents of the chart information obtained at S507, that is, the list of the registered charts and the chart configuration information on each chart included in the list are read from the HDD 104 or the like.

At S1003 that follows, whether or not each chart within the chart list read at S1002 adapts to the specifications of Measuring device 1, which is the selected measuring device, is determined based on the specification information and the chart configuration information, which are read. Then, in a case the chart adapts to the specifications, the results are that the chart can be used for colorimetry and in a case where the chart does not adapt to the specifications, the results are that the chart cannot be used for colorimetry. Details of the determination processing (in the following, called "specification adaptability determination processing") will be described later.

The above is the flow of the colorimetry possibility determination processing that takes the measuring device as a reference at S508.

<<Specification Adaptability Determination Processing>>

Figure 11:
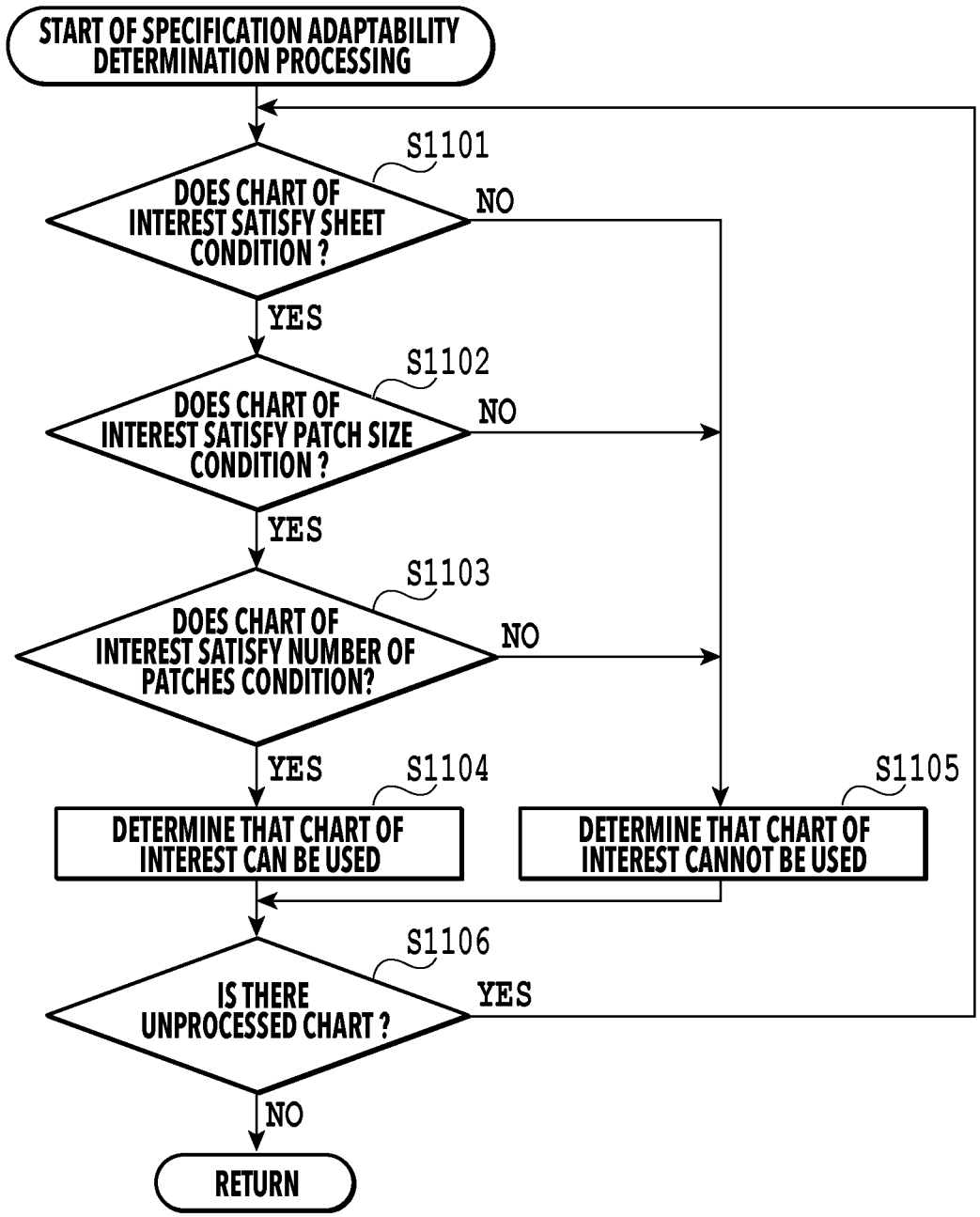
FIG. 11 is a flowchart showing details of specification adaptability determination processing.

FIG. 11 is a flowchart showing details of the specification adaptability determination processing to determine whether or not the chart adapts to the specifications of the selected measuring device. This determination processing is performed for each chart by determining the chart of interest from the chart list. Here, details of the specification adaptability determination processing are explained along the flowchart in FIG. 11 on the assumption that Custom A is determined as the chart of interest and the contents in Table 2 below are read as the chart configuration information.

TABLE 2

| | Chart Configuration Information | |
|---|---|---|
| 1 | Chart name | Custom A |
| 2 | Number of patches (x × y) | 736 (32 × 23) |
| 3 | Patch size | 10 × 10 mm |
| 4 | Sheet size | A4 |
| 5 | Sheet type | Plain paper |

<<Specification Adaptability Determination Processing>>

At S1101, whether or not the sheet width, the sheet length, and the sheet thickness of the chart of interest satisfy the sheet conditions specified by the specification information on the selected measuring device is determined. In case where determination results indicate that all the sheet conditions are satisfied, the processing advances to S1102 and in a case where even one of them does not satisfy the sheet condition, the processing advances to S1105. Here, as regards Custom A, the sheet size is "A4", the sheet type is "Plain paper", the sheet width is 210 mm, the sheet length is 297 mm, and the sheet thickness is 0.09 mm. Then, the conditions specified in the specification information on Measuring device 1 are that the sheet width is within the range of 45 to 330 mm, the sheet length is within the range of 170 to 1,500 mm, and the sheet thickness is within the range of 0.05 to 0.45 mm. In this case, all the sheet width, the sheet length, and the sheet thickness satisfy the conditions, and therefore, the processing advances to S1102.

At S1102, whether or not the patch size of the chart of interest satisfies the patch size condition (minimum patch size) specified by the specification information on the selected measuring device is determined. In a case where determination results indicate that the patch size condition is satisfied, the processing advances to S1103 and in a case where the patch size condition is not satisfied, the processing advances to S1105. Here, the patch size of Custom A is 10×10 mm. Then, the minimum patch size of Measuring device 1 is 6×6 mm. In this case, the patch size condition is satisfied, and therefore, the processing advances to S1103.

At S1103, whether or not the number of patches of the chart of interest satisfies the number of patches condition (maximum number of patches) specified by the specification information on the selected measuring device is determined. In a case where determination results indicate that the number of patches condition is satisfied, the processing advances to S1104 and in a case where the number of patches condition is not satisfied, the processing advances to S1105. Here, the number of patches of Custom A is 32×23=736. Then, the maximum number of patches of Measuring device 1 is 1,394. In this case, the number of patches condition is satisfied, and therefore, the processing advances to S1104.

At S1104, it is determined that the chart of interest adapts to the specifications of the selected measuring device and can be used for colorimetry and the processing advances to S1106. On the other hand, at S1105, it is determined that the chart of interest does not adapt to the specifications of the selected measuring device and cannot be used for colorimetry and the processing advances to S1106.

At S1106, whether or not all the charts included in the chart list are processed is determined. In a case where there is an unprocessed chart, the processing returns to S1101, and the next chart of interest is determined and the processing is continued. On the other hand, in a case where all the charts are processed, this processing is exited.

The above is the contents of the specification adaptability determination processing. It may also be possible to take into consideration the measurement condition of the selected measuring device in addiction to each condition at S1101 to S1103 described above. For example, whether the current colorimetry environment satisfies the setting values of M0, M1, and M2 at the time of measuring the sheet including a fluorescent whitening agent, illumination conditions (D50 and D65), and density conditions (STATUS-A, STATUS-T and the like) is added as a determination element. At this time, it is sufficient to cause a user to input information on the colorimetry environment corresponding to the above-described measurement conditions separately or in advance, and so on.

As described above, according to the present embodiment, among the charts registered in advance, the charts that satisfy the specifications of the measuring device selected by a user are displayed automatically at the time of chart selection. Due to this, it is no longer necessary for a user to check him/herself whether a chart defined uniquely by a user satisfies the specifications of the measuring device in a case where the chart is used as well.

Second Embodiment

In the first embodiment, the aspect is such that the list of the charts that satisfy the specifications of the selected measuring device is displayed and from the list, a desired chart is selected. That is, the aspect is such that the measuring device is determined first and restrictions are imposed on the chart side by taking the measuring device as a reference. However, in a case where restrictions are imposed on the chart side, it is not possible to appropriately deal with the demand of a user that the user desires to perform color verification by using the custom chart anyway. Consequently, an aspect is explained as a second embodiment in which the chart is determined first and then restrictions are imposed on the measuring device side by taking the chart as a reference. Explanation of the contents common to those of the first embodiment, such as the basic configuration of the color verification system, is omitted.

<Flow of Processing of Entire System>

Figure 12:
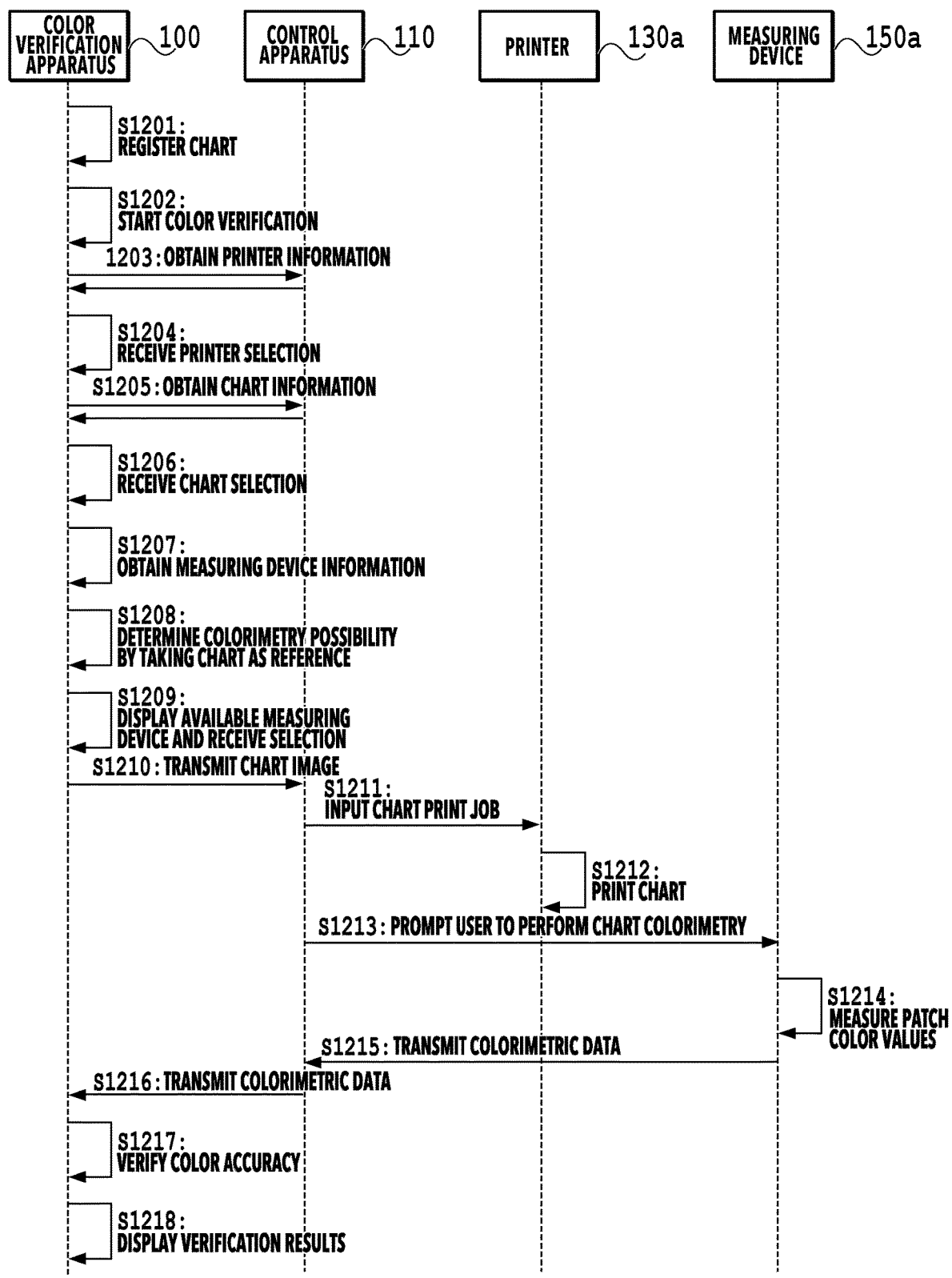
FIG. 12 is a sequence diagram showing a flow of processing in a color verification system according to a second embodiment.

FIG. 12 is a sequence diagram showing a flow of processing in the color verification system according to the present embodiment. In the following, the flow of the processing of the entire color verification system in the present embodiment is explained along the sequence diagram in FIG. 12 by focusing attention on points different from those of the first embodiment.

From the custom chart registration (S1201) to the target printer selection reception (S1204) (corresponding to S501 to S504, respectively, in the sequence diagram in FIG. 5) are the same as those of the first embodiment, and therefore, explanation is omitted.

Following the target printer selection reception, the data obtaining unit 403 obtains the chart information including the list of the registered charts and the chart configuration information on each chart included in the list (S1205). This processing is the processing corresponding to S507 in the sequence diagram in FIG. 5.

In a case where the chart information is obtained, next, processing to receive the selection of a chart that is used for color verification is performed (S1206). Specifically, the user selection is received via the UI screen that is displayed on the display unit 105 by the UI control unit 402 and the setting processing unit 406 sets the chart relating to the selection as the chart that is used for color verification. This processing is the processing corresponding to S509 in the sequence diagram in FIG. 5, but differs from that of the first embodiment in that all the registered charts are displayed as the charts a user can select.

Following the chart selection reception, the data obtaining unit 403 obtains the measuring device information including the list of the measuring devices 1 to 3 managed by the control apparatus 110, the specification information on each measuring device, and the measuring device status information (S1207). This processing is the processing corresponding to S505 in the sequence diagram in FIG. 5.

In a case the measuring device information is obtained, the colorimetry determination unit 404 performs processing to determine whether or not it is possible to perform colorimetry of the patch on the chart by using the chart selected at S1206 for each measuring device included in the measuring device list (S1208). Details of the colorimetry possibility determination processing that takes the chart as a reference will be described later.

In a case where the colorimetry possibility determination processing is completed, processing to receive the selection of a measuring device that is used for colorimetry from the measuring devices determined to have the specifications capable of performing colorimetry of the patch of the selected chart is performed (S1209). Specifically, the user selection is received via the UI screen that is displayed on the display unit 105 by the UI control unit 402 and the setting processing unit 406 sets the measuring device relating to the selection as the measuring device that is used for colorimetry. At this time, on the Measuring Device Selection screen, based on the results of the colorimetry possibility determination processing, to be described later, the available measuring devices are displayed in a list. That is, display processing to gray out the measuring device that does not adapt to the selected chart, and so on, is performed. Further, for the attachment selection possibility, the same display processing in view of the results of the chart configuration determination processing, to be describe later, is performed as well. As in the first embodiment, it may also be possible to further display a UI screen indicating the reason for being not selectable and/or the condition to enable measurement as shown, for example, in FIG. 9C, and so on, in place of (or in addition to) the gray-out display. It may also be possible to display, in addition to the patch size, information relating to attachment necessity, such as whether it is necessary to perform measurement a plurality of times by switching measurement illumination conditions, whether the sensor for the measuring ruler is supported, and the condition of the minimum number of patches or the scan possible area is satisfied.

From the subsequent chart image transmission (S1210) to the verification results display (S1218) (corresponding to S510 to S518 in the sequence diagram in FIG. 5, respectively) are the same as those of the first embodiment, and therefore, explanation is omitted.

<Colorimetry Possibility Determination Processing>

Figure 13:
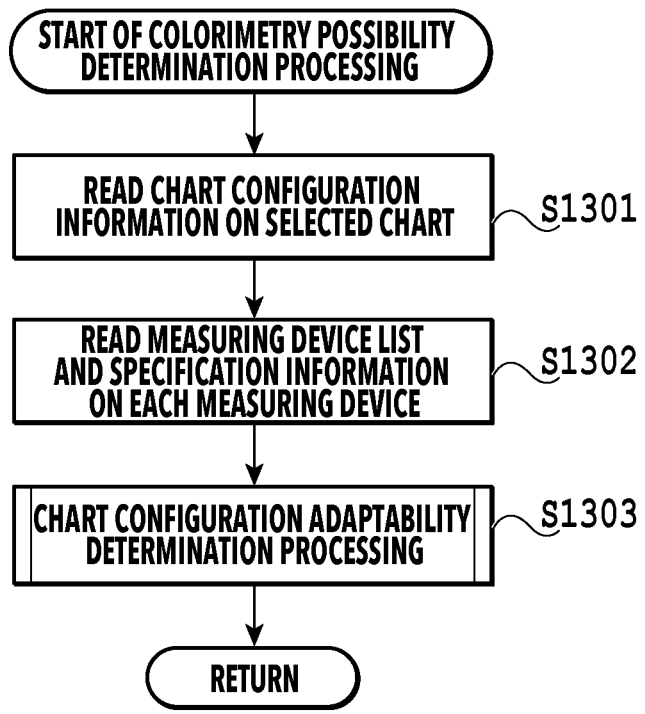
FIG. 13 is a flowchart showing a flow of colorimetry possibility determination processing according to the second embodiment.

Following the above, the colorimetry possibility determination processing that takes the chart as a reference (S1208) is explained in detail by referring to the flowchart in FIG. 13. The series of processing shown in the flowchart in FIG. 13 is implemented by the CPU 101 of the color verification apparatus 100 loading the program corresponding to the colorimetry determination unit 404 from the ROM 102 onto the RAM 103 and executing the program. In the following explanation, symbol "S" means a step.

At S1301, the chart configuration information on the chart selected by a user is read from the HDD 104 or the like. Here, it is assumed that the chart configuration information shown in Table 3 below is read.

TABLE 3

| | Chart Configuration Information | |
|---|---|---|
| 1 | Chart name | Custom B |
| 2 | Number of patches (x × y) | 736 (32 × 23) |
| 3 | Patch size | 4 × 4 mm |

TABLE 3-continued

| | Chart Configuration Information | |
|---|---|---|
| 4 | Sheet size | A4 |
| 5 | Sheet type | Plain paper |

At next S1302, the contents of the measuring device information obtained at S1207, that is, the list of the measuring devices and the specification information on each measuring device included in the list are read from the HDD 104 or the like.

At S1303 that follows, whether or not each measuring device included in the measuring device list read at S1302 adapts to the chart configuration of Custom B, which is the selected chart, is determined based on the chart configuration information and the specification information, which are read. The results are that in a case where the measuring device adapts to the chart configuration, it can be used for colorimetry and in a case where measuring device does not adapt to the chart configuration, it cannot be used for colorimetry. Details of this determination processing (in the following, called "chart configuration adaptability determination processing") will be described later.

The above is the flow of the colorimetry possibility determination processing that takes the chart as a reference at S1208.

<<Chart Configuration Adaptability Determination Processing>>

Figure 14:
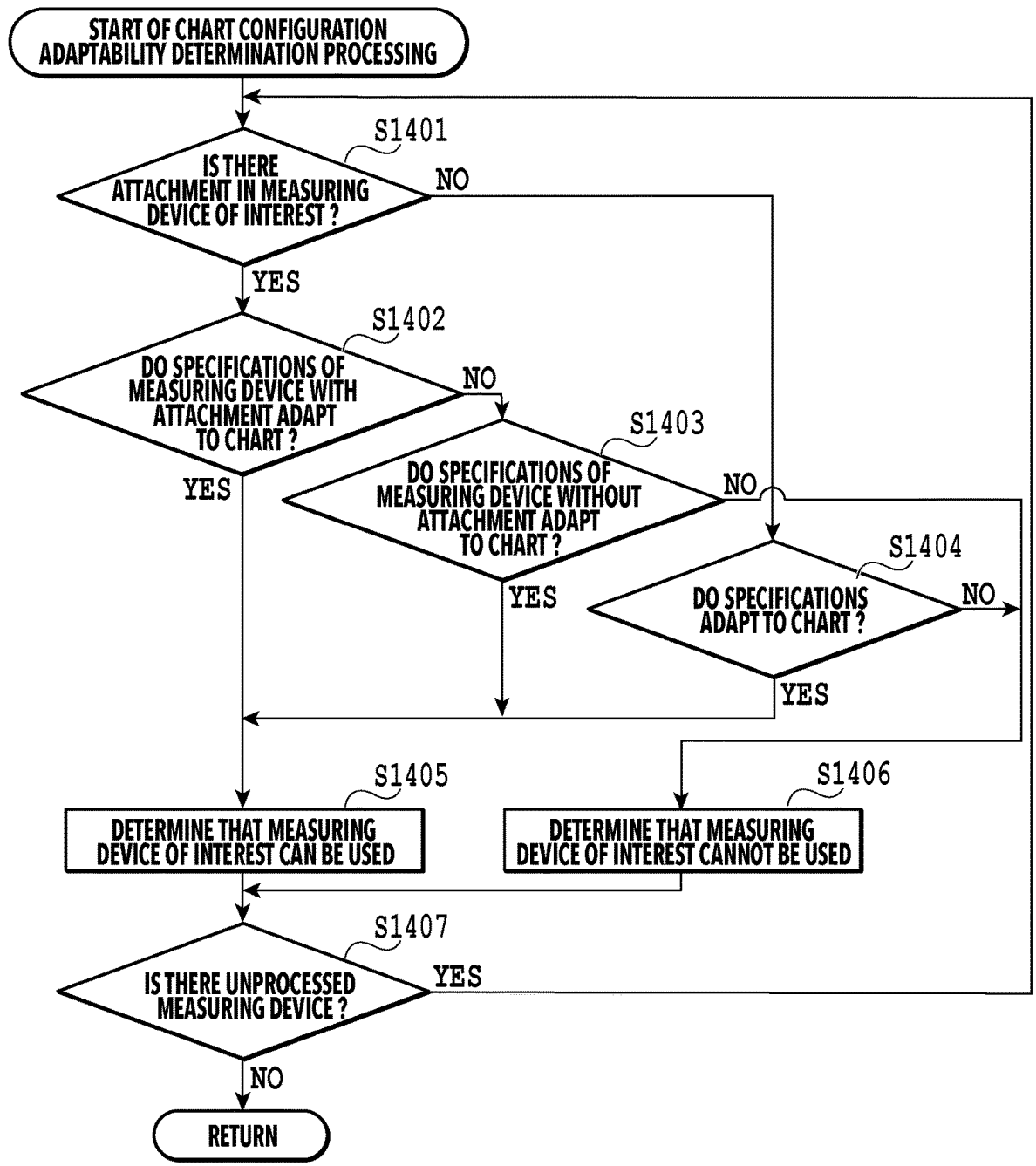
FIG. 14 is a flowchart showing details of chart configuration adaptability determination processing.

FIG. 14 is a flowchart showing details of the chart configuration adaptability determination processing to determine whether or not the measuring device adapts to the chart configuration of the selected chart. This determination processing is performed for each measuring device by determining the measuring device of interest from the measuring device list. Here, details of the chart configuration adaptability determination processing are explained along the flowchart in FIG. 14 on the assumption that the measuring device 2 is determined as the measuring device of interest and as the specification information, the contents in Table 4 below are read.

TABLE 4

| | Specification Information | | |
|---|---|---|---|
| | Attachment (measuring ruler) | None | Existent |
| 1 | Sheet width (y) | 45-330 mm | Same as left |
| 2 | Sheet length (x) | 170-1500 mm | 170-700 mm |
| 3 | Sheet thickness | 0.05-0.45 mm | Same as left |
| 4 | Minimum patch size | 6 × 6 mm | 4 × 4 mm |
| 5 | Number of patches per page | A4: 1 - 1394<br>A3: 1 - 2928 | A4: 6 - 1394<br>A3: 6 - 2928 |

At S1401, whether or not an attachment exists in the measuring device of interest is determined. In a case where an attachment exists, the processing advances to S1402 and in a case where no attachment exists, the processing advances to S1404. In a case of the measuring device 2, as shown in Table 4 described above, the measuring ruler exists as an attachment, and therefore, the processing advances to S1402.

At S1402, whether or not the specifications (sheet width, sheet length, sheet thickness, minimum patch size, number of patches per sheet (per page) and the like) of the measuring device in a case where there is an attachment adapt to the selected chart is determined. In a case where the specifications adapt to the selected chart, the processing advances to S1405 and in a case where the specifications do not adapt to the selected chart, the processing advances to S1403. Then, at S1403, whether or not the specifications (sheet width, sheet length, sheet thickness, minimum patch size, number of patches per sheet and the like) of the measuring device in a case where there is no attachment adapt to the selected chart is determined. In a case where the specifications adapt to the selected chart, the processing advances to S1405 and in a case where the specifications do not adapt to the selected chart, the processing advances to S1406. As shown in Table 3, Custom B adapts to the specifications of the measuring device 2 in a case where there is a measuring ruler, and therefore, the processing advances to S1405.

At S1404, whether or not the specifications (sheet width, sheet length, sheet thickness, minimum patch size, number of patches per sheet and the like) of the measuring device of interest adapt to the selected chart is determined. In a case where the specifications adapt to the selected chart, the processing advances to S1405 and in a case where the specifications do not adapt to the selected chart, the processing advances to S1406.

At S1405, it is determined that the measuring device of interest can be used for colorimetry of the selected chart and the determination results are stored in the HDD 104 or the like. At this time, in a case where an attachment exists in the measuring device of interest, the determination results are stored in association with the presence/absence of the attachment. At S1406, it is determined that the measuring device of interest cannot be used for colorimetry of the selected chart and the determination results are stored in the HDD 104 or the like. At this time, in a case where an attachment exists in the measuring device of interest, the determination results are stored in association with the presence/absence of the attachment.

At S1407, whether or not all the measuring devices included in the measuring device list are processed is determined. In a case where there is an unprocessed measuring device, the processing returns to S1401, and the next measuring device of interest is determined and the processing is continued. On the other hand, in a case where all the measuring devices are processed, this processing is exited.

The above is the contents of the chart configuration adaptability processing.

MODIFICATION EXAMPLE

In the present embodiment, the Measuring Device Selection screen that takes into consideration the results of the colorimetry possibility determination processing that takes the selected chart as a reference is displayed on the display unit 105 and the user selection of the measuring device that is used is received. However, it may also be possible to perform, after receiving the user selection of a desired measuring device, the colorimetry possibility determination processing for the measuring device relating to the selection and in a case where the measuring device does not adapt to the configuration of the selected chart, force the user to cause the measuring device to adapt to the configuration of the selected chart. For example, it may also be possible to perform control to switch "not used" to "used" even in a case where "not used" of an attachment is selected.

As above, according to the present embodiment, the measuring device that adapts to the configuration of the chart selected by a user is displayed automatically. Due to this, as in the first embodiment, for example, even in a case where a chart defined uniquely is used, it is no longer necessary for a user him/herself to check whether the chart satisfies the specifications of the measuring device.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, at the time of selection of a measuring device and a chart, which are necessary for color verification of a printer, it is possible to easily grasp the possibility of the use thereof. Due to this, the convenience of a user improves.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-120847, filed Jul. 21, 2021, which is hereby incorporated by reference wherein in its entirety.

What is claimed is:

1. An information processing apparatus for performing, by using data obtained by a measuring device reading a chart printed by a printer, color verification of the printed chart, the information processing apparatus comprising:
   a display unit configured to display;
   a determination unit configured to determine whether the chart is usable for the color verification based on configuration information of the chart and specification information of the measuring device; and
   a display control unit configured to cause the display unit to display a determination result of the determination unit,
   wherein in a case where the chart is unusable as a result of the determination, the display control unit causes the display unit to display a reason why the chart is unusable.

2. The information processing apparatus according to claim 1, wherein the display control unit makes the display different for each of a case where the chart is determined to be usable and a case where the chart is determined to be unusable.

3. The information processing apparatus according to claim 1,
wherein in a case where the chart is determined to be unusable, the display control unit grays out or omits the display.

4. The information processing apparatus according to claim 1,
wherein in a case where the chart is determined to be unusable, the display control unit displays information necessary for making the chart usable.

5. The information processing apparatus according to claim 1, further comprising:
a registration unit configured to register the chart printed by the printer in association with image data read and obtained by the measuring device and the configuration information of the chart; and
an output unit configured to output, to the printer, the image data registered in the registration unit,
wherein the determination unit determines whether the chart is usable for the color verification based on the configuration information of the chart registered in the registration unit and the specification information of the measuring device, and
in a case where the chart is determined to be usable, the output unit outputs, to the printer, the image data registered in the registration unit.

6. The information processing apparatus according to claim 1,
wherein the configuration information of the chart includes information on a number of patches that the chart has, a patch size, or a sheet size of the chart, and
the specification information of the measuring device includes a number of readable patches of the chart, a patch size, a sheet size of the chart, a minimum patch size, presence/absence of a measuring ruler of the measuring device, or presence/absence of an auto feeder unit of the measuring device.

7. An information processing apparatus for performing, by using data obtained by a measuring device reading a chart printed by a printer, color verification of the printed chart, the information processing apparatus comprising:
a determination unit configured to determine whether the measuring device is usable for the color verification based on configuration information of the chart and specification information of the measuring device; and
a display control unit configured to cause a display unit to display a determination result of the determination unit,
wherein in a case where the measuring device is unusable as a result of the determination, the display control unit causes the display unit to display a reason why the measuring device is unusable.

8. The information processing apparatus according to claim 7,
wherein the display control unit makes the display different for each of a case where the measuring device is determined to be usable and a case where the measuring device is determined to be unusable.

9. The information processing apparatus according to claim 7,
wherein in a case where the measuring device is determined to be unusable, the display control unit grays out or omits the display.

10. The information processing apparatus according to claim 7,
wherein in a case where the measuring device is determined to be unusable, the display control unit displays information necessary for making the measuring device usable.

11. The information processing apparatus according to claim 7, further comprising:
a registration unit configured to register the chart printed by the printer in association with image data read and obtained by the measuring device and the configuration information of the chart; and
an output unit configured to output, to the printer, the image data registered in the registration unit,
wherein the determination unit determines whether the measuring device is usable for the color verification based on the configuration information of the chart registered in the registration unit and the specification information of the measuring device, and
in a case where the measuring device is determined to be usable, the output unit outputs, to the printer, the image data registered in the registration unit.

12. An information processing apparatus for performing, by using data obtained by a measuring device reading a chart printed by a printer, color verification of the printed chart, the information processing apparatus comprising:
a determination unit configured to determine whether the chart is usable for the color verification or whether the measuring device is usable for the color verification based on configuration information of the chart and specification information of the measuring device; and
a display control unit configured to cause a display unit to display a determination result of the determination unit,
wherein in a case where the chart or the measuring device is unusable as a result of the determination, the display control unit causes the display unit to display a reason why the chart or the measuring device is unusable.

13. An information processing apparatus for performing, by using data obtained by a measuring device reading a chart printed by a printer, color verification of the printed chart, the information processing apparatus comprising:
the measuring device;
a determination unit configured to determine whether the chart is usable for the color verification or whether the measuring device is usable for the color verification based on configuration information of the chart and specification information of the measuring device; and
a display control unit configured to cause a display unit to display a determination result of the determination unit,
wherein in a case where the chart or the measuring device is unusable as a result of the determination, the display control unit causes the display unit to display a reason why the chart or the measuring device is unusable.

14. A control method of an information processing apparatus for performing, by using data obtained by a measuring device reading a chart printed by a printer, color verification of the printed chart, the control method comprising the steps of:
determining whether the chart is usable for the color verification based on configuration information of the chart and specification information of the measuring device; and
causing a display unit to display a reason why the chart is unusable in a case where the chart is unusable as a result of the determination.

* * * * *